Oct. 17, 1933.  F. T. HARDING  1,930,678
REFRIGERATING METHOD AND APPARATUS
Filed May 27, 1929   2 Sheets-Sheet 1
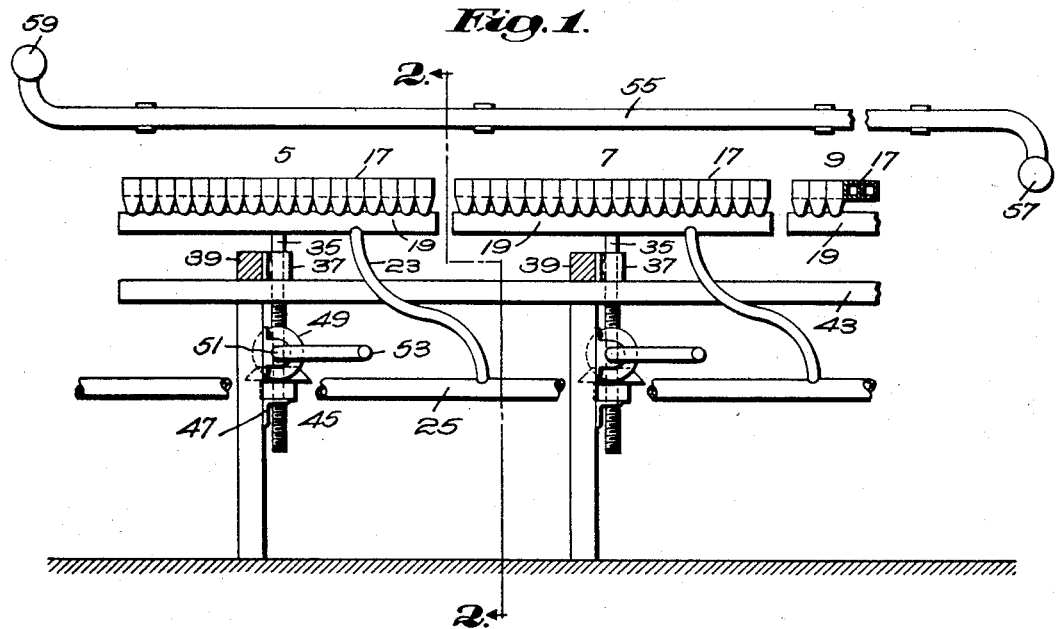
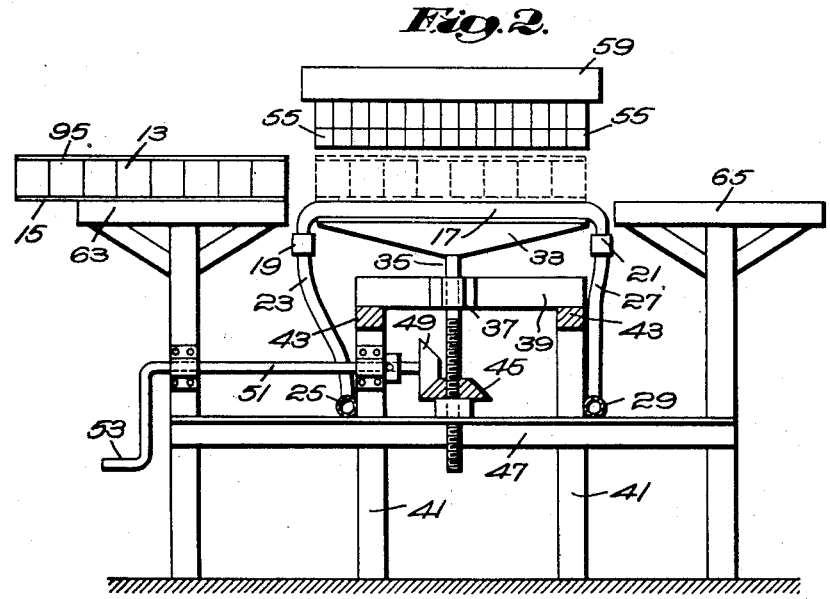
Inventor:
Franklin T. Harding
by Emery Booth Varney & Townsend
Attys Oct. 17, 1933.    F. T. HARDING    1,930,678
REFRIGERATING METHOD AND APPARATUS
Filed May 27, 1929    2 Sheets-Sheet 2
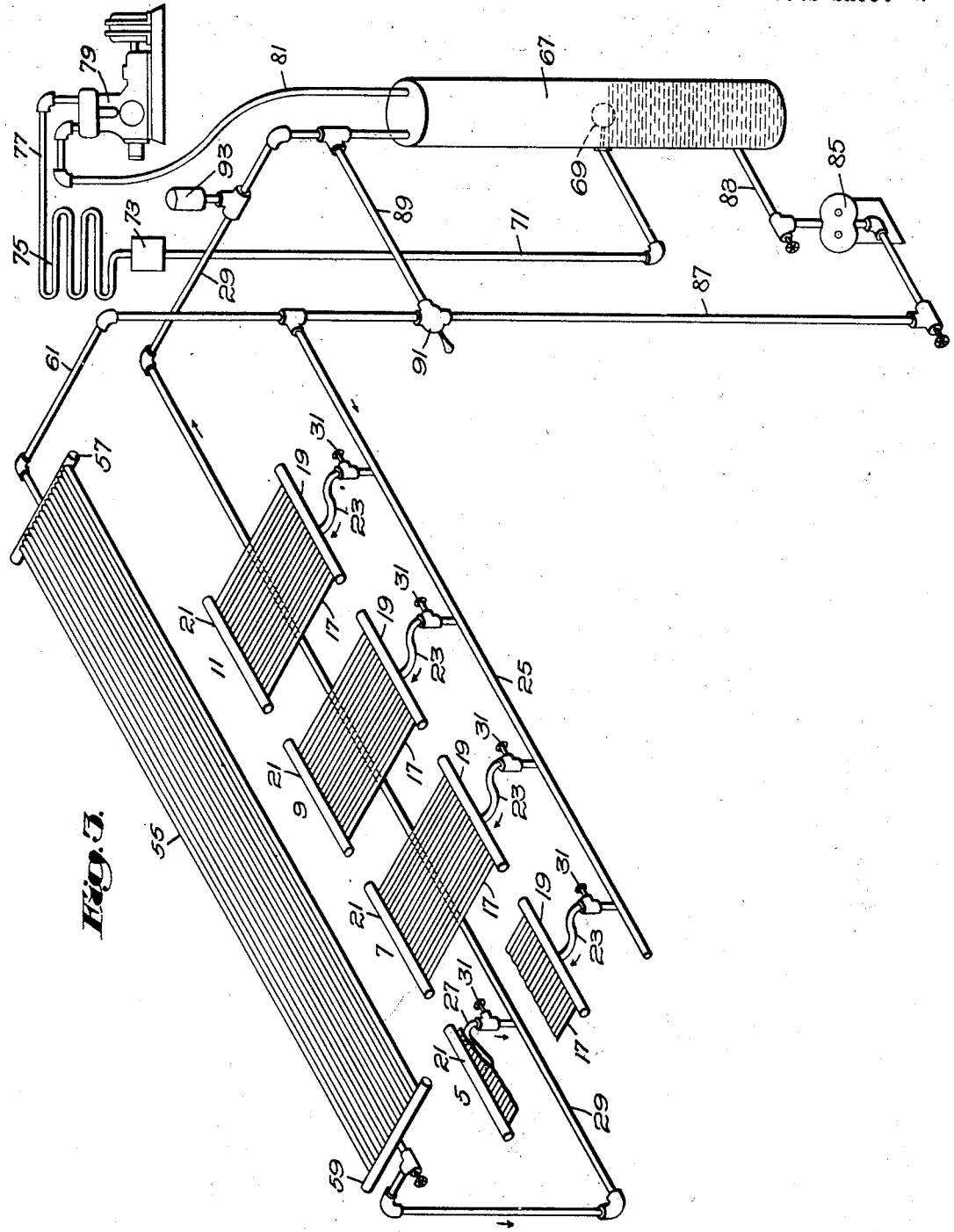
Inventor:
Franklin T. Harding
by Emery, Booth, Varney & Townsend
Attys Patented Oct. 17, 1933

1,930,678

UNITED STATES PATENT OFFICE 1,930,678

REFRIGERATING METHOD AND APPARATUS

Franklin T. Harding, Arlington, Mass., assignor, by mesne assignments, to Frosted Foods Company, Inc., Dover, Del., a corporation of Delaware Application May 27, 1929. Serial No. 366,196

15 Claims. (Cl. 62—104)

This invention relates to apparatus particularly, though not exclusively, intended for the refrigeration, chilling or hardening of food stuffs, and especially those assembled in packaged or other unit form.

One object of the invention is to provide a mechanically simplified apparatus, relatively inexpensive and relatively low in up-keep and operating cost for subjecting an assemblage of food stuff units or other materials to the action of an expansible refrigerating medium under such conditions that the latter is applied efficiently, directly, with certainty and under conditions of safety and without the necessary use of a secondary medium, such as brine or the like.

Another object of the invention is to provide a novel apparatus for refrigeration in a relatively simplified form, such that a substantially continuous freezing operation may be carried out and there may be had a substantially continuous cycle of charging and discharging of the materials to be chilled while maintaining an approximately constant load on the source of refrigerating power. These and other objects of the invention will be best understood from the following description when taken in connection with the accompanying illustration of one specific embodiment of the apparatus, while its scope will be more particularly pointed out in the appended claims.

In the drawings:

Figure 1 is a side elevation of a portion of an apparatus embodying one form of the invention;

Fig. 2 is a sectional elevation of the apparatus shown in Fig. 1 taken on the line 2—2 in Fig. 1; and Fig. 3 is an illustration in perspective, and more or less diagrammatic, showing the piping arrangement and connections to the source of refrigerating power.

Referring to the drawings and to the embodiment of the invention therein disclosed for illustrative purposes, the refrigerating or freezing apparatus there shown comprises a series of refrigerating sections 5, 7, 9, 11, etc., which are arranged to serve as supporting or carrying members for the food units or other materials to be frozen, which latter, as hereinafter set forth, also have their opposite upper sides brought into heat absorbing relation to the other opposed refrigerating walls or areas maintained above the said supporting sections.

This apparatus may be employed for the refrigeration of a wide range of food stuffs and other materials, having, by way of example, application to the hardening of partly frozen ice cream packed in cartons, packaged fish fillets, packaged berries, and food stuffs of various other kinds.

In the drawings (Fig. 2) there is represented an assemblage of such food packages 13 mounted, for convenience in handling, on a flat sheet metal tray 15 in position to be placed on the refrigerating unit 7.

Each supporting refrigerating section is composed of a series of separate expansion pipes 17, adapted to have circulated therein any suitable refrigerant, such for example as anhydrous ammonia, the pipes being herein arranged horizontally, extending in parallel relation transversely across the apparatus, and having their ends at one side of the section bent down to enter to a common supply header 19 (Fig. 2) and at the opposite side similarly bent to enter a return header 21. Separate supply and return headers are provided for each section, each supply header 19 being connected by a flexible pipe connection 23 to a supply main 25 and each return header 21 by a flexible pipe 27 to a return main 29. A cut-off valve 31 (as shown in Fig. 3) is provided between each header and its respective main, so that any refrigerating section may be cut out of operation at will.

The expansion pipes 17 of each section are arranged in closely adjacent relation so that the outer walls of the pipe within which the refrigerant is circulated provide refrigerating areas in direct heat absorbing relation to the units to be frozen, and comprising areas in direct contact with such units, or separated from such units only by intervening bodies of good heat conducting material, such as the sheet metal tray 15. The heat is accordingly abstracted from the food stuff units by substantially direct action of the refrigerant through the walls of the expansion pipes.

In order to provide an extended area of heat absorption between the food packages and the refrigerating unit with which the food packages contact, and at the same time to provide for the most effective action of the refrigerant on the food packages, the expansion pipes may be constructed of steel pipe or tubing, preferably of rectangular and herein square cross section, arranged with closely adjacent sides, and herein in substantial contact, so that the upper surfaces of the tubes present in assembled relation a substantially flat and substantially continuous refrigerating surface or wall, the interior of which is subject to the direct action of the refrigerant and the exterior of which is in direct heat absorbing relation to the bottoms of the food packages by direct and substantially continuous contact with the under side of the sheet metal tray 15 when the cartons or other units to be frozen are placed on the refrigerator section, or in contact with the units themselves if the tray or other support is not employed.

For the purpose of loading and unloading the refrigerating sections, as will more fully appear, and bringing the food units into refrigerating relation to the refrigerating walls or areas maintained above the supporting sections, as well as for the purpose of adapting the different sections to food units of varying dimensions, it is desirable to provide means for adjusting the different sections vertically.

The different refrigerating sections, comprising each its assemblage of pipes with the connected headers 19 and 21, are herein shown mounted on separate, vertically adjustable supports 33 in which all exposed sides of the expansion pipes, except the upper surfaces, are preferably insulated, as by cork-board or the like, the details of such insulating covering being herein omitted for the sake of clearness.

Any suitable means, mechanical, pneumatic, hydraulic or otherwise, for the vertical adjustment of the support 33 may be employed. In the illustrative embodiment each support 33 is carried by an upright supporting rod 35 slidably but non-rotatably mounted in the collar 37 carried by the cross frame bar 39. The latter is supported by the upright posts 41, the several posts being united by longitudinal frame members 43 into a unitary supporting frame which extends the length of the apparatus. The lower part of the supporting rod 35 is threaded and engages a rotatably but longitudinally fixed nut 45 carried by the cross bar 47 secured to the upright posts 41. To turn the nut, the latter is provided with beveled gear teeth which mesh with the teeth of a beveled gear 49 fixed on the horizontal shaft 51, so that by means of the hand crank 53 secured to such shaft at the side of the apparatus the attendant can raise or lower each refrigerating section at will, each independently of the other, the connections of the headers to their respective mains being maintained in the various positions required by such adjustment by the flexible pipes 23 and 27.

To bring the opposite, and herein upper, surfaces of the food units also within the direct and effective action of the refrigerating medium, each assemblage of food units, when placed on the refrigerating section (represented by dotted lines in Fig. 2), may be raised by means of the hand crank and brought into direct heat absorbing relation to an overhead refrigerating member consisting of a series of expansion pipes 55 which are arranged to form a refrigerating surface extending above each carrier section and in cooperative relation thereto.

The pipes 55 may be of any suitable size, shape and arrangement, but as herein shown are also of substantially square cross section arranged in parallel relation and in substantial contact, so that their under surfaces present a substantially continuous, flat, refrigerating wall. The upper series of pipes 55, however, are shown as extending longitudinally and for the entire length of the apparatus and are preferably supported in fixed position so that their under surfaces present a fixed, refrigerating wall against which the assemblage of food packages placed on any one of the lower refrigerating sections may be brought into close relationship by the vertical adjustment of that particular section. The exposed sides except the under surface of the pipes 55 may also be suitably insulated, as by cork-board or the like, the details of such insulation being herein also omitted for the sake of clearness.

The series of pipes 55 of the upper refrigerating member are connected at one end of the apparatus to the common supply header 57 and at the opposite end to the common return header 59, the latter being connected to the return main 29 and the former to a supply main 61.

Any number of refrigerating sections may be employed in series, dependent on the floor space available and the capacity desired for the apparatus. A typical installation, for example, may comprise ten or twelve lower or carrier sections, with a single elongated overhead member extending over the entire space occupied by the lower sections.

For convenience in charging and discharging the separate sections, a loading platform or table 63 (see Fig. 2) and an unloading or discharging platform or table 65 may be provided at the approximate height of the sections when the latter are lowered, such platforms extending the entire length of the apparatus at opposite sides thereof.

Any suitable refrigerating system may be employed, but in utilizing a volatile refrigerant, as in the illustrated apparatus, there is provided a low pressure receiver 67 in which there is maintained a body of liquid refrigerant, such, for example, as ammonia, a constant level of which is maintained by a float valve 69 controlling the entrance of the liquid through the pipe 71 from the receiver 73. The receiver 73 is connected to the condenser 75 and the latter through the pipe 77 to the compressor 79, the compressor withdrawing the gaseous ammonia from the upper part of the low pressure receiver 67 through the pipe 81 and maintaining a partial vacuum in the upper part of the receiver.

Liquid ammonia is forced from the bottom of the receiver 67 through the pipe 83 by means of the circulating pump 85 through the pipe 87 connected to the supply mains 25 and 61, from which mains it circulates through the various expansion pipes and is there expanded, the volatilized ammonia returning to the upper part of the low pressure receiver 67 through the return main 29. A drainage pipe 89 connects the return main 29 just outside of the receiver with the supply main 87 through a control valve 91, so that when the apparatus is shut down the valve may be opened and the condensed refrigerant allowed to gravitate back into the receiver 67.

The refrigerating system described can be operated economically and efficiently since it requires but two power actuated units, to wit, the compressor and circulating pump, and since the expansion of the refrigerant takes place directly at the point where the heat is required to be abstracted from the food units to be frozen and without opportunity for intermediate wastage or loss. It can also be operated with certainty and with safety since the expansion pipes and the flexible connections are subjected to relatively low pressure, which, even when the apparatus is shut down and when the pressure is the greatest, need rise to but a few pounds above the atmosphere. To prevent any excess of pressure being maintained in the expansion pipes and the flexible connections, a safety valve 93 is provided in the return main 29.

In the operation of the apparatus, a refrigerating section is loaded by assembling the food units, represented in Fig. 2, on the tray 15 which is placed on the loading platform or table 63. A second sheet metal plate 95 may be employed to cover the food units. As thus assembled, the units, with their upper and lower sheet metal coverings, are then moved into position (indicated by dotted lines in Fig. 2) to rest directly upon the underlying expansion pipes of the adjacent refrigerating section. The section is then raised by manipulating the hand crank 53 to bring the upper surfaces of the units or the sheet metal covering, if the latter is employed, into firm and direct contact with the under surfaces of the upper refrigerating member. The compressor and circulating pump having been started into operation, the assemblage of food units is then allowed to remain in that position, subject to the direct action of the expanding refrigerant applied to both sides of the assemblage, until the necessary freezing effect has been attained, after which the section on which they rest is lowered and the entire assemblage withdrawn.

In the practical operation of the apparatus, the successive sections are loaded one after another, a sufficient number of sections being preferably provided so that the time elapsing in loading the entire apparatus will suffice to bring the units with which the first section has been charged into the necessary frozen condition. When that point is reached, the charge of the first section is removed and immediately replaced by a fresh charge of unfrozen units, and this process of unloading and loading successive sections can be carried out continuously and without interruption or loss of time.

This may be conveniently performed by two attendants, one engaged in loading the successive sections from the loading platform 63 and the other unloading the successively frozen units from the next preceding sections on the unloading platform 65. The loading and unloading of the apparatus, however, may be carried out from the same side of the machine, or without the use of the loading and unloading platforms, with the aid of trucks or other movable carriers.

Under the described continuous process of charging and discharging, the load on the refrigerating system, after the apparatus is once fully charged, remains substantially constant throughout the entire operation, being subjected only to such variation as is introduced by the fresh charge of any one individual section.

Since the units are in direct heat absorbing relation to the refrigerant, the refrigerant is applied under the most efficient conditions to the food products without intermediate loss and without the interposition of any secondary refrigerating medium, such as brine. It will also be seen that a uniform application of temperature to all the goods is assured throughout the entire apparatus. Since no secondary refrigerating medium is necessary, auxiliary apparatus for handling and applying such secondary medium is dispensed with, and the herein described installation is relatively inexpensive and relatively low in up-keep and operating cost.

Since an expansible refrigerant may be maintained at uniform conditions of temperature and pressure throughout the series of upper and lower expansion pipes, the temperature conditions to which each assemblage of food units is being subjected at any given time may be ascertained readily and with certainty from the usual indicating devices ordinarily employed in connection with a refrigerating system of the type herein described.

While the lower refrigerating areas on which the food units rest are herein shown as adjustable, it is obvious that the reverse arrangement may be had, and lower refrigerating areas provided by means of stationary expansion pipes and the upper areas by vertically adjustable sections. Furthermore, while a vertical, relative adjustment of the two opposing refrigerating walls between which the food units are frozen provides a mechanically simple arrangement and conduces to the ease of handling the goods, other arrangements of the expansion pipes may be provided in which the adjustment is had in directions other than the vertical. If desired, the capacity of the apparatus may be increased by arranging the upper series of stationary pipes 55 so that additional assemblage of food units may be placed on the upper surface thereof and frozen between such pipes and a second set of vertically adjustable refrigerating sections located above the same.

While I have herein shown and described for the purpose of illustration one specific embodiment of the invention, it is to be understood that various other arrangements of the operating elements hereof may be made and various changes in the form and relationship of parts may be had, and extensive deviations made from the illustrated embodiment, all without departing from the spirit of the invention.

Having thus described my invention, what I claim as new and desire to secure by Letters Patent is:—

1. A refrigerating apparatus comprising a series of separate, vertically movable sections, each having substantially horizontal refrigerating walls which are subject to the direct action of a volatile refrigerant, said sections adapted to support the materials to be frozen, an opposed refrigerating wall above all the material-supporting sections, also subject to the direct action of a volatile refrigerant, and means for independently and vertically adjusting said sections to raise said materials and bring them into close heat-absorbing relation to both the lower and upper refrigerating walls.

2. A refrigerating apparatus comprising a series of separate refrigerating elements arranged side by side and presenting each a substantially flat, continuous, refrigerating, contact area, said elements each having an expansion space for a volatile refrigerant to provide for the direct action thereof on said refrigerating walls, an opposed refrigerating element for each section, also presenting a substantially flat, continuous, refrigerating, contact area and having an expansion space for a volatile refrigerant through which the refrigerating wall is subject to the direct action thereof, said refrigerating elements being adapted to receive between them materials to be frozen, means for independently moving said sections with relation to said opposed refrigerating element to bring refrigerating contact areas thereof into close heat-absorbing relation to opposite sides of said materials, and means for circulating a volatile refrigerant through said spaces.

3. In a refrigerating apparatus, opposed refrigerating elements presenting each to the materials to be frozen a substantially flat, refrigerating, contact area, the one comprising a plurality of stationary expansion pipes of rectangular cross section arranged in closely adjacent parallel relation and the other comprising a plurality of independent sections, each section also having a plurality of expansion pipes of rectangular cross section arranged in closely adjacent parallel relation, supply and return conduits, common supply and return headers connecting the opposite ends of the expansion pipes of said first element to the supply and return conduits respectively, supply and return headers for the expansion pipes of each section of said other element, flexible connections between the supply and return headers of each section and the supply and return conduits respectively, means for circulating through said conduits, headers and expansion pipes a volatile refrigerant, and means for separately and independently moving each section of one refrigerating element toward and away from the opposed element to bring the refrigerating, contact areas thereof into close heat-absorbing relation to opposite sides of the materials to be frozen.

4. In a refrigerating apparatus, opposed refrigerating elements presenting each to the materials to be frozen a substantially flat, refrigerating, contact area, the one having a plurality of expansion pipes arranged in parallel relation and the other comprising a plurality of independent sections arranged side by side, each section also having a plurality of expansion pipes arranged in parallel relation, supply and return conduits connected to the pipes of each element, means for circulating a volatile refrigerant through said conduits and said pipes, means for separately and independently moving each section of one element toward and away from the opposed element to bring the refrigerating, contact areas thereof into close heat-absorbing relation to opposite sides of the materials to be frozen.

5. A refrigerating apparatus comprising opposed upper and lower refrigerating elements, presenting refrigerating surfaces between which the materials to be frozen are adapted to be received, one of said elements being sub-divided into sections, and means for independently adjusting said sections vertically to bring the upper and lower refrigerating surfaces into close heat-absorbing relation to the materials.

6. A refrigerating apparatus comprising opposed upper and lower refrigerating elements presenting refrigerating surfaces between which an assemblage of units to be frozen is adapted to be received, one of said elements being sub-divided into sections, means for independently adjusting said sections vertically to bring the upper and lower refrigerating surfaces into close heat-absorbing relation to upper and lower surfaces of the units, and a loading platform extending lengthwise said elements at the approximate height of the lower refrigerating surfaces to assist in installing an assemblage of units to be frozen into a section of the apparatus.

7. A refrigerating apparatus comprising opposed upper and lower refrigerating elements presenting refrigerating surfaces between which the units to be frozen are adapted to be received, one of said elements being sub-divided into sections, means for independently adjusting said sections vertically to bring the upper and lower refrigerating surfaces into close heat-absorbing relation to the upper and lower surfaces of the units, and an unloading platform extending lengthwise the series of sections and at the approximate height of the lower refrigerating surfaces to assist in unloading the frozen units from the apparatus.

8. Refrigerating apparatus including a refrigerating member having an extensive effective area, and a series of refrigerating members having smaller effective areas and being each movable independently to engage products to be refrigerated between themselves and the member first mentioned.

9. Refrigerating apparatus including a stationary elongated refrigerating member, and a series of smaller refrigerating members movable toward said elongated member to engage products to be refrigerated at different areas in said member.

10. Refrigerating apparatus including an elongated refrigerating member, a series of carriers having substantially horizontal faces for supporting products to be frozen, and means for moving said carriers to press the products supported thereon against different areas of said elongated member.

11. Refrigerating apparatus including a refrigerating member of relatively large capacity having connections for a refrigerant, and a series of refrigerating members each having relatively small refrigerating capacity movable separately to engage products to be frozen against the member of large capacity.

12. A direct action refrigerating apparatus, comprising two opposed and relatively spaced refrigerating members each containing an expansion space therein, means for moving one of said members from and toward the other member in a manner to receive and press therebetween products to be frozen, the expansion spaces of each of said members constituting the expansion spaces of a refrigerating system, means for supplying a refrigerant to the inlet ends of said spaces, and means for creating an exhaust vacuum at the outlet ends thereof thereby directly cooling the said members by the expansion of the refrigerant in said spaces.

13. A direct action refrigerating apparatus, comprising a refrigerating member of relatively large capacity having an expansion space therein and connections for an expansible refrigerant, and a plurality of refrigerating members each of relatively small refrigerating capacity and each having an expansion space therein and being separately movable to engage products to be frozen against the member of large capacity, the expansion spaces of all of said members constituting the expansion space of a refrigerating system of the compression type.

14. Refrigerating apparatus including an overhead refrigerating member having connections for receiving a refrigerating medium and presenting a refrigerating surface, a series of carriers having flat product-supporting faces each being in area a fraction of the area of the surface of said overhead member, and mechanism associated with each carrier section for lifting the same to engage the product supported thereon against the surface of said overhead member while other carriers remain in lowered position.

15. In a refrigerating apparatus, a flat rigid heat-conductive member comprising spaced parallel headers and a series of connecting pipes of rectangular cross section arranged with their adjacent side walls substantially in contact and bent downwardly at each end to enter said headers, the upper walls of said pipes presenting a flat substantially continuous refrigerating surface disposed above the headers, and means for supplying a refrigerating medium to said member.

FRANKLIN T. HARDING.